United States Patent Office 3,429,860
Patented Feb. 25, 1969

3,429,860
METHOD OF PREPARING AMIDE POLYMERS
Jack Hurst, Merriam, Kans., assignor, by mesne assignments, to Gulf Oil Corporation, Pittsburgh, Pa., a corporation of Pennsylvania
No Drawing. Continuation of applications Ser. No. 172,806, Feb. 12, 1962, and Ser. No. 512,195, Dec. 7, 1965. This application Apr. 11, 1967, Ser. No. 630,138
U.S. Cl. 260—86.7         16 Claims
Int. Cl. C08f *19/10;* C08g *20/00, 41/00*

ABSTRACT OF THE DISCLOSURE

Polyethylene-type polymers having side chains containing carboxamide groups are prepared by a process which comprises reacting a polyethylene-type polymer having carboxylate alkyl ester-containing side chains with a nitrogenous base in the presence of a minor quantity of an alkali metal hydroxide.

CROSS REFERENCES TO RELATED APPLICATIONS

This is a continuation of U.S. application Ser. No. 172,086, filed Feb. 12, 1962, now abandoned, and application Ser. No. 512,195, filed Dec. 7, 1965 now abandoned.

Copending application Ser. No. 537,743, filed Mar. 21, 1966, which is a continuation of application Ser. No. 137,018, filed Sept. 11, 1961, now abandoned, by Harry D. Anspon, discloses polyethylene-type polymers which have monomeric carboxamide side chains derived from polyethylene-type polymers consisting of copolymers of ethylene and an alkyl acrylic ester.

DISCRIPTION OF THE INVENTION

This invention relates to a novel method of providing a polyethylene-type polymer having amide-containing side chains. More particularly, this invention relates to providing in finely divided form a polyethylene-type polymer having side chains containing carboxamide groups.

The process provided hereby comprises heating a reaction mixture of a polyethylene-type polymer having side chains containing carboxylate alkyl ester groups of the structure

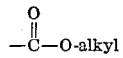

with an ammonia or an organo-substituted derivative of ammonia at a reaction temperature in the presence of about one hundred mole parts of said alkyl ester groups of the starting polyethylene-type polymer.

It has previously been found that certain polyethylene-type polymers having such side chains containing amide groups have highly desired properties. For example, in the copending application of Harry D. Anspon, Ser. No. 137,018, filed Sept. 11, 1961, now U.S. Patent 3,337,517, are disclosed such polyethylene-type polymers which have monomeric side chains derived from polyethylene-type polymers consisting of copolymers of ethylene and an alkyl acrylic ester. The acrylic ester copolymer is made up of the units derived from the copolymerization of ethylene and an alkyl acrylic ester, illustrated respectively as

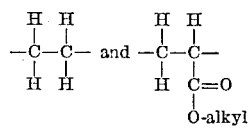

resulting in a general structure of the main polymer chain of

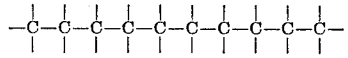

Certain difficulties have been experienced in the production of polymers such as described in the above referred to copending application. For example, in the conversion of the ethylene-alkyl acrylic ester copolymers to polyethylene-type polymers having side chains containing carboxamide groups, it has been found that after conversion the amide-containing product is often difficult to recover from the reactor and to process for the reasons that considerable caking or coating of the polymer on the inside of the reactor is usually experienced and the main portion of the product is ordinarily obtained in a lump-form. The lump-form of the polymer product results in a troublesome and costly work-up of the polymer.

By the processes of this invention it has been found that these disadvantages, as well as others, have been largely or completely circumvented. Ordinarily, the amide-containing polyethylene-type polymers provided by the inventive processes provided hereby result in products which are in a finely divided form, ordinarily as a suspension easily separable from the reaction medium. Besides, it has been noted that the inside walls of the reactor and the surfaces of the internal working parts of the reactor are essentially free of a coating or caking of polymer. Thus, it is seen that the processes provided hereby enable a more economical and more convenient method of providing the desired amide-containing polyethylene-type polymers.

Suitable starting polymers in the practice of this invention can be, as mentioned above, ethylene-alkyl acrylic ester copolymers wherein the main chain of the polymer is a polyethylene chain as above described. When employing ethylene-alkyl acrylic ester copolymers as the starting polymer, it is preferred to employ copolymers which have a highly uniform character insofar as the alkyl acrylic ester groups are evenly distributed throughout the polymeric chains. These highly suitable acrylic ester copolymers have groups corresponding either to acrylic esters which are alkyl esters of unsubstituted acrylic acid (having the structure $CH_2=CH-COO$-alkyl) or to acrylic esters of simply substituted alpha-acrylic acids such as methacrylic acid (having the structure $CH_2=C(CH_3)-COO$-alkyl). Such desirable starting copolymers are mentioned in the above referred to U.S. Patent 3,337,517.

Other suitable polyethylene-type starting polymers having carboxylate alkyl ester-containing side chains also derived from monomers employed in the formation of the polymers include copolymers, terpolymers, and the like, wherein the monomers employed in a copolymerization with ethylene are selected from such esters of ethylenically unsaturated acids polymerizable with ethylene. Such esters include alkyl esters of itaconic acid, fumaric acid, maleic acid, crotonic acid, isocrotonic acid, citraconic acid, mesaconic acid, and the like esters of ethylenically unsaturated acids which are copolymerizable with ethylene. The process of this invention is directed particularly to the conversion of polyethylene-type polymers having side alkyl ester-containing groups wherein said ester containing groups are present in the starting polymer in a concentration up to about one mole of said ester containing side groups per three moles of ethylene groups of the main polyethylene chain, ethylene groups being used in the broad sense of

groups. Preferably the starting polymers have one mole of said ester containing side groups for each about five to about fifty moles of said ethylene groups. Ordinarily, suitable starting polymers can be provided by generally known procedures such as those termed in the art as high pessure polyethylene procedures employing free radical catalysts such as peroxide and azo free radical initiators. In general, procedures whereby satisfactory ethylene copolymers can be provided are set forth in U.S. Patent No. 2,200,429, issued to Perrin et al. It is known in the polymer art that polyethylene chains usually have some degree of branching. The polymers employable as starting materials in this invention can have a reasonable amount of branching.

In the processes of this invention, one of the reactants is an amide-forming substance which is capable of converting the ester groups to amide groups. It has been found satisfactory to employ concentrated aqueous ammonia if an unsubstituted amide polymer is desired. Suitably, concentrated aqueous ammonium hydroxide such as the 17 N. commercial product can be used. Although the specific exemplary discussion is extensively directed to the unsubstituted ammonia, it is to be understood that primary and secondary amines capable of converting the alkyl ester group to the corresponding secondary and tertiary amides can be employed which result in the formation of the desired amide-containing polymers. Illustratively, lower mono- and dialkyl substituted ammonias such as methylamine, ethylamine, isopropylamine, t-butylamine, diethylamine, ethanolamine, octylamine, and the like can be employed.

The employment of an inert organic reaction solvent, such as p-xylene, which will not interfere with the conversion of the acrylate to the amide form but will often permit easier recovery and processing of the obtained ethylene-acrylamide interpolymer, e.g., can be incorporated into the reaction mixtures. Other solvents and solvent mixtures can be used in the reaction, such as alkanols, xylene-isopropanol mixtures, and the like.

In the conversion, a temperature customarily upwards of 180° C. is required. Suitably, a reaction temperature of about 200° C. to about 300° C. can be employed with a preferable reaction temperature being about 200° C. to about 250° C. When the amide is formed from ammonia, a reaction temperature of about 220° to 225° C. is satisfactory generally. The upper limit of the reaction temperatures is governed by the decomposition point of the polymers.

Conveniently, the reaction can be carried on in a heated pressure reactor which can be mechanically agitated as by rocking and in which an autogenous pressure can be generated. In converting the copolymers of, for example, a lower alkyl ester of unsubstituted acrylic acid, such as methyl acrylate copolymers, the reaction is customarily carried on for about two to about twenty hours in order to obtain suitable formation of the desired amide-containing interpolymer. Ordinarily about three to about ten hours is a sufficient reaction period. Of course, the reaction time will vary depending upon the specific reaction variables. Particularly will the higher temperatures and, at times, longer reaction times be required when the acrylate groups of the copolymers are esters of alpha-substituted acrylic acids such as methacrylic acid esters. Also, the somewhat more stringent conditions can be frequently used to advantage when the esters employed in the copolymer formation are derived from unsubstituted acrylic acid wherein higher or branched alkyl groups constitute the alkyl portion of the acrylic ester.

The polymer on completion of the reaction is removed from the reactor and is separated from the reaction mixture. The polymer is suitably washed, such as with water or methanol, and is ground to provide a subdivided form and is dried, as desired.

As little as about one mole and up to about ten moles of alkali metal hydroxide per one hundred moles of ester groups of the starting polymers has been found to be satisfactory. Preferably, at least about two to about six moles of the hydroxide per one hundred moles of ester groups will generally be employed for optimum results. Any carboxylate salt groups of the final polymer product can be converted to free acid groups by conventional procedures as by washing the provided polymers with a suitable mineral acid such as dilute hydrochloric acid. The provided polymer is in the finely divided form, and therefore the need for grinding or subdividing is minimized or completely eliminated.

The following examples are in further illustration of the processes of this invention but are not in limitation thereof except as defined by the appended claims. The ethylene-acrylate copolymers employed as the starting polymer in the examples are prepared in accordance with the hereinabove referred to U.S. Patent 3,337,517.

Example I

A quantity of 575 g. of an ethylene-methyl acrylate copolymer having 24.8 percent by weight (or 0.109 mole of acrylate per mole of ethylene) of groups corresponding to methyl acrylate as determined by infrared absorption is employed in the preparation. The starting methyl acrylate copolymer has a density of 0.9447, a melt index of 1.81, a film impact value of 3100 p.s.i., and a high degree of elasticity.

The copolymer together with 575 ml. of aqueous ammonium hydroxide (17 N.) and 1150 ml. of p-xylene are aded to a one-gallon Magne-Dash reactor. The reaction mixture is heated to 230° C. by means of a heating jacket surrounding the reactor at autogenous pressure and is maintained at the 230° C. temperature for fifteen hours. The reaction mixture is cooled and a white tough plug of the amide polymeric product is removed. The polymeric product is washed thoroughly with methanol and is ground to a small particle size employing a Wiley mill. The ground amide polymer is dried in vacuo at 50° C. The dried product on infrared analysis shows that essentially all of the methyl acrylate groups are converted to the amide form.

The formed amide interpolymer product is characterized as follows: 3.07 percent nitrogen; about all of the starting ester groups are converted to amide groups; 0.9528 g./cc. density; 147 ft. lbs./sq. in. tensile impact; 200 percent elongation at a rate of stretch of 10 in./min.; 0/10 failure at 70° C. brittleness value; and 31,000 lbs./sq. in. flexural stiffness.

The above procedure is repeated with the exceptions that 100 g. of the ethylene-methyl acrylate copolymer, 1200 ml. of the concentrated ammonium hydroxide, 0.5 g. of sodium hydroxide, 220° C. temperature, and a sixteen-hour reaction period, are employed. The product of this procedure is obtained as a slurry of the product which is easily separated from the reaction mixture by filtration. Thus, the grinding step required above is unnecessary.

Example II

Comparative experiments have been carried out employing the same starting copolymer and analogous conditions. In the experiments in which an alkali metal hydroxide is employed, essentially no coating or caking of the desired amide-containing polymer results in contrast to the observation in repeat runs using no hydroxide. Additionally, the product is obtained in a suspension form which when isolated results in an amide-containing polymer in a granular-like form, whereas when no hydroxide is used and no stirring is employed the polymer product is obtained largely in a "plug" form.

In the experiments, the same uniform, normally solid ethylene-methyl acrylate copolymer is used as the starting polymer. The copolymer contains 20.6 percent by weight of groups corresponding to methyl acrylate as determined by infrared analysis. The starting copolymer has a density of 0.9421 g./cc., a melt index of 1.75, an ultimate tensile strength of 1500 p.s.i., an elongation value of 800 percent, a yield value of 460 p.s.i., and a flexural stiffness value of 2690 p.s.i.

One hundred parts of the acrylate copolymer, twelve hundred parts of concentrated ammonium hydroxide (11.7 N.), and one-half part of sodium hydroxide pellets are added to a one-gallon Magne-Dash reactor. The reactor is closed and the reaction mixture is heated to 220° C. for a sixteen-hour period under autogenous pressure. The reaction product is cooled and is removed from the reactor. The reaction product consists of a slurry of the desired amide-containing polymer. The suspended polymer product is removed by filtration and is washed by suspending the polymer in distilled water, the polymer is removed from the suspension by filtration, and the removed polymer is air dried. Infrared analysis shows that essentially all the ester groups of the starting copolymer are converted to amide groups.

It is noted that the reactor walls, and the baffles and cooling coils of the reactor, which are all exposed to the reaction mixture during the conversion of the ester groups to amide groups, are virtually free of any coating or caking of polymer.

The above experiment is repeated employing the same ratio of the copolymer and concentrated ammonium hydroxide reactants. The desired polymer product is obtained largely in a plug form, with a few small fragments. Infrared analysis also shows an essentially complete conversion of the ester groups of the starting polymer to amide groups. Additionally, there is noted a heavy coating of polymer on the internal walls of the reactor and on the cooling coils.

The reaction is again repeated employing one hundred fifty parts of the starting polymer, seventeen parts by weight of concentrated ammonium hydroxide, and seventeen parts of Triton N–101 (a polyethylene oxide surfactant marketed by Rohm and Haas Company).

At the end of the reaction period of sixteen hours, the product is removed from the reactor. The product consists of a very hard mass of amide-containing polymer.

The experiment employing the Triton N–101 surfactant is repeated with the sole exception that one part of sodium hydroxide is incorporated into the reaction mixture. Again in the final polymer the ester groups have been essentially all converted to amide groups. The reaction mixture consists of a slurry of the desired polymer which is easily separable from the reacton medium. It is noted that there is essentially no coating or caking of the polymer on the internal surfaces of the reactor.

Example III

The following example was conducted employing a twenty-gallon autoclave reactor. A quantity of twelve pounds of an elastomeric ethylene-methyl acrylate copolymer containing 20 percent by weight of methyl acrylate is employed.

The quantity of the polymer, together with 21.6 g. of sodium hydroxide pellets and eighteen pounds of concentrated aqueous ammonia (11.7 N) and sixty-five pounds of water are added to the reactor. The reactor is closed and the reaction mixture is heated at 210–220° C. for six hours with stirring under autogenous pressure. The reaction mixture is then removed from the reactor and cooled. The reaction mixture consists of a slurry of the desired polymer in the reaction medium.

It is noted that essentially no polymer adhered to the walls of the reactor, the baffles of the reactor, or the agitator of the reactor which stirred the reaction mixture during the conversion.

The infared analysis shows the starting copolymer to be essentially completely converted from the ester form to the amide form.

The procedures outlined in the above examples can be repeated to provide amide-containing interpolymers within the scope of this invention by employing other ethylene-alkyl acrylic ester copolymers instead of the ethylene-methyl acrylate copolymers. Illustrative of such ethylene-alkyl acrylic ester copolymers are the respective copolymers containing groups corresponding to butyl acrylate, hexyl acrylate, lauryl acrylate, ethyl acrylate, 2-ethylhexyl acrylate and the like. The reaction is carried on in order to provide the amide-containing interpolymers at about 210° C. to 270° C. for a time sufficient to provide the degree of amide formation desired, for most preparations about five to sixteen hours being an adequate reaction period. Alkyl methacrylate copolymers corresponding to those alkyl acrylic ester copolymers mentioned hereinabove can also be substituted wherein frequently it is advantageous to use a somewhat higher reaction temperature than found adequate when using corresponding alkyl acrylate copolymers and a longer reaction period. Like copolymers of ethylene containing 10 to 25 percent by weight of groups corresponding to alkyl esters of other ethylenically unsaturated carboxylic acids can be substituted in the above examples. Such copolymers include copolymers of ethylene with methyl or butyl esters of maleic acid, fumaric acid, and itaconic acid. Likewise, either potassium hydroxide or lithium hydroxide can be used instead of sodium hydroxide in the above illustrative examples with generally equivalent results.

What is claimed is:

1. The process of providing a polyethylene type polymer having carboxamide-containing side chains in finely divided form, said process comprising heating a reacton mixture of a copolymer of ethylene and a carboxylate alkyl ester at a reaction temperature of at least 180° C. with a substance selected from the group consisting of ammonia and primary and secondary amines together with from about one to less than about ten moles of an alkali metal hydroxide per one hundred moles of said carboxylate alkyl ester groups of the starting polymer, said starting polymer having up to about one mole of said ester groups per three moles of

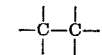

groups of the main chain of the starting polymer.

2. A process of claim 1 wherein the quantity of alkali metal hydroxide employed is from about two to about six moles.

3. A process of claim 1 wherein the reaction temperature employed is from about 200° C. to about 300° C.

4. A process of claim 1 wherein the reaction temperature is from about 200° C. to about 250° C.

5. A process of claim 1 wherein the starting polyethylene-type polymer has one mole of said ester groups per about five to about fifty moles of

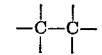

groups of the main chain of the starting polymer.

6. A process of claim 1 wherein the amide-forming substance is ammonia.

7. A process of claim 1 wherein the starting polymer is a copolymer of ethylene and an alkyl acrylic ester and wherein the quantity of alkali metal hydroxide employed is from about two to about six moles.

8. A process of claim 7 wherein the starting polymer is a copolymer of ethylene and an alkyl acrylic ester of the formula $H_2C=CH-COO=alkyl$.

9. A process of claim 1 wherein the alkali metal hydroxide employed is sodium hydroxide.

10. A process of claim 1 wherein the alkali metal hydroxide employed is potassium hydroxide.

11. The process of providing a polyethylene-type polymer having carboxamide-containing side chains in finely divided form, said process comprising heating a reaction mixture of a copolymer of ethylene and an alkyl acrylic ester, ammonia, and from about one to less than about ten moles of an alkali metal hydroxide per one hundred moles of said ester groups of the starting polymer, at a reaction temperature of at least 180° C., said starting polymer being a uniform, normally solid copolymer wherein the alkyl acrylic ester groups are evenly distributed throughout the polymeric chains and having up to about one mole of said ester groups per three moles of

groups of the main chain of the starting polymer.

12. The process of claim 11 wherein the alkyl acrylic ester has the formula $H_2C=CH-COO=alkyl$.

13. The process of claim 11 wherein the copolymer of ethylene with an alkyl acrylic ester is an elastomeric copolymer of ethylene with about 20 to 25 percent by weight methyl acrylate and substantially all of the ester groups in the starting copolymer are converted to amide groups.

14. The process of claim 13 wherein the alkali metal hydroxide employed is sodium hydroxide.

15. A polyethylene-type polymer having carboxamide-containing side chains, from about one to less than about 10% of the total side chains of the said polymer in alkali metal salt form.

16. The polymer of claim 15 wherein said side chains are evenly distributed throughout the polymeric chains and wherein said polymer contains up to about one mole of side chain-containing monomer for each three moles of ethylene groups.

References Cited

UNITED STATES PATENTS

| | | | |
|---|---|---|---|
| 2,953,541 | 9/1960 | Pecha et al. | 260—45.5 |
| 2,953,551 | 9/1960 | White | 260—86.7 |
| 3,089,897 | 5/1963 | Balmer | 260—486 |
| 3,337,517 | 8/1967 | Anspon | 260—86.7 |

JOSEPH L. SCHOFER, *Primary Examiner.*

J. C. HAIGHT, *Assistant Examiner.*

U.S. Cl. X.R.

260—80.6